(12) United States Patent
Duggi

(10) Patent No.: US 7,415,019 B2
(45) Date of Patent: Aug. 19, 2008

(54) APPARATUS AND METHOD FOR COLLECTING ACTIVE ROUTE TOPOLOGY INFORMATION IN A MOBILE AD HOC NETWORK

(75) Inventor: Mohan R. Duggi, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 10/764,129

(22) Filed: Jan. 23, 2004

(65) Prior Publication Data

US 2005/0041627 A1 Feb. 24, 2005

Related U.S. Application Data

(60) Provisional application No. 60/497,274, filed on Aug. 22, 2003.

(51) Int. Cl.
*H04L 12/28* (2006.01)
*G01R 31/08* (2006.01)

(52) U.S. Cl. .................. 370/392; 370/238; 370/338

(58) Field of Classification Search ........... 370/338, 370/392, 238
See application file for complete search history.

(56) References Cited

U.S. PATENT DOCUMENTS

| | | | | |
|---|---|---|---|---|
| 6,535,498 | B1 * | 3/2003 | Larsson et al. | 370/338 |
| 6,628,620 | B1 | 9/2003 | Cain | |
| 6,718,394 | B2 | 4/2004 | Cain | |
| 6,728,232 | B2 | 4/2004 | Hasty, Jr. et al. | |
| 6,763,013 | B2 * | 7/2004 | Kennedy | 370/338 |
| 6,763,014 | B2 * | 7/2004 | Kennedy | 370/338 |
| 6,771,666 | B2 | 8/2004 | Barker, Jr. | |
| 6,870,846 | B2 * | 3/2005 | Cain | 370/392 |
| 6,894,985 | B2 * | 5/2005 | Billhartz | 370/252 |
| 6,937,602 | B2 | 8/2005 | Whitehill et al. | |
| 6,940,832 | B2 * | 9/2005 | Saadawi et al. | 370/328 |
| 6,975,614 | B2 * | 12/2005 | Kennedy | 370/338 |
| 6,982,982 | B1 | 1/2006 | Barker, Jr. et al. | |
| 7,027,426 | B2 * | 4/2006 | Billhartz | 370/338 |
| 7,072,304 | B2 * | 7/2006 | Ng et al. | 370/238 |
| 7,082,117 | B2 * | 7/2006 | Billhartz | 370/338 |
| 2002/0039357 | A1 | 4/2002 | Lipasti et al. | |
| 2003/0123419 | A1 | 7/2003 | Rangnekar et al. | |
| 2003/0202512 | A1 * | 10/2003 | Kennedy | 370/389 |

(Continued)

FOREIGN PATENT DOCUMENTS

CA 2 361 707 A1 8/2000

(Continued)

*Primary Examiner*—Rafael Perez-Gutierrez
*Assistant Examiner*—Christopher M. Brandt

(57) ABSTRACT

A first MANET node that collects route information associated with a first route from a source MANET node to a destination MANET node in a mobile ad hoc network (MANET). The first MANET node comprises: 1) a radio frequency (RF) transceiver for wirelessly communicating with other MANET nodes according to an ad hoc on-demand vector (AODV) protocol; and 2) a controller for receiving incoming data packets from the RF transceiver and sending outgoing data packets to the RF transceiver. The controller receives a Path Marker Request message generated by the source MANET node and retrieves first route topology data associated with the first route from the first Path Marker Request message. The route first topology data identifies all intermediate MANET nodes in the first route coupling the first MANET node to the source MANET node.

20 Claims, 4 Drawing Sheets

U.S. PATENT DOCUMENTS

| | | |
|---|---|---|
| 2003/0204623 A1 | 10/2003 | Cain |
| 2003/0204625 A1 | 10/2003 | Cain |
| 2004/0028016 A1* | 2/2004 | Billhartz .................... 370/338 |
| 2004/0042434 A1* | 3/2004 | Kennedy ................... 370/338 |
| 2004/0057409 A1* | 3/2004 | Kennedy ................... 370/338 |
| 2005/0013253 A1* | 1/2005 | Lindskog et al. ............ 370/238 |
| 2005/0041662 A1* | 2/2005 | Kuo et al. ................... 370/389 |
| 2006/0182034 A1* | 8/2006 | Klinker et al. .............. 370/238 |
| 2007/0183346 A1* | 8/2007 | Thubert et al. .............. 370/254 |

FOREIGN PATENT DOCUMENTS

| | | |
|---|---|---|
| CA | 2 422 201 A1 | 3/2002 |
| CN | 1417992 A | 5/2003 |
| JP | 2001-274815 | 10/2001 |
| JP | 2002-354016 | 12/2002 |
| JP | 2003-218886 | 7/2003 |
| JP | 2003-258811 | 9/2003 |
| JP | 2004-248180 | 9/2004 |
| KR | 10-2004-0024784 | 3/2004 |
| KR | 10-2004-0107960 | 12/2004 |
| WO | WO 01/65719 A1 | 9/2001 |
| WO | WO 03/098383 A2 | 11/2003 |

\* cited by examiner

APPARATUS AND METHOD FOR COLLECTING ACTIVE ROUTE TOPOLOGY INFORMATION IN A MOBILE AD HOC NETWORK

CLAIM OF PRIORITY TO PRIOR APPLICATION

The present invention claims priority to U.S. Provisional Patent Application Ser. No. 60/497,274, which was filed on Aug. 22, 2003.

CROSS-REFERENCE TO RELATED APPLICATION

The present invention is related to that disclosed in the following U.S. Provisional Patent Application Ser. No. 60/497,274, filed on Aug. 22, 2003, entitled "COLLECTION OF ACTIVE ROUTE TOPOLOGY IN AODV PROTOCOL."

TECHNICAL FIELD OF THE INVENTION

The present invention relates generally to wireless networks and, more specifically, to an IEEE 802.11 mobile ad hoc network (MANET) that implements an AODV protocol or similar reactive, ad hoc routing protocols.

BACKGROUND OF THE INVENTION

Wireless network topologies that enable wireless nodes (i.e., mobile stations, wireless terminals) to communicate with each other and with fixed networks generally fall into two categories: i) infrastructure-based and ii) infrastructure-less. Infrastructure-based networks have traditionally been based on the cellular concept and require a high level of infrastructure support. In an infrastructure-based network, wireless nodes communicate through access points (e.g., base stations) connected to the fixed network (e.g., Internet). Typical infrastructure-based networks include GSM networks, UMTS networks, CDMA networks, WLL networks, WLAN, and the like.

In an infrastructureless network, wireless nodes (i.e., mobile stations, wireless terminals) communicate directly rather than through access points or other base stations. One common and increasingly popular infrastructureless network topology is the mobile ad hoc network (MANET). A MANET is a group of wireless nodes that dynamically form a network with each other and without using any pre-existing fixed network infrastructure. In most cases, wireless nodes of a MANET are small mobile devices that are relatively limited in term of CPU capability, memory size, and power consumption.

Mobile ad hoc networks are expected to continue to grow over the next 2-3 years to become the dominant peer-to-peer communication technology. Cell phones are being equipped with IEEE-802.11 and other wireless LAN technologies. The proliferation of cell phones and the ubiquity of economical IEEE-802.11 networks will create a new kind of mobile, ad-hoc and peer-to-peer network.

As noted above, a mobile ad hoc network (MANET) can be set up without using a pre-existing network infrastructure. This can be done anywhere and at anytime. The wireless nodes of a MANET are connected by wireless links and are free to move randomly. The wireless nodes also act as routers. A MANET supports traffic types that are different from the traffic types typically found in an infrastructure-based wireless network. MANET traffic types include: 1) peer-to-peer traffic; 2) remote-to-remote traffic; and 3) dynamic traffic.

In peer-to-peer traffic, there is only one hop between the communicating wireless nodes (i.e., direct communication). In this instance, the network traffic (in bits/second) is usually constant. In remote-to-remote traffic, there are two or more hops between communicating wireless nodes, but a stable route is maintained between the source and destination nodes. This often occurs if several nodes stay within range of each other in one area or if the nodes move as a group. Dynamic traffic results when the MANET nodes move around and communication routes must be reconstructed. This often causes poor connectivity and network traffic occurs in short bursts.

Each MANET node is autonomous and may function as both a host and a router. Thus, each wireless node performs basic host processing and performs router switch functions. Thus, endpoints and switches are indistinguishable in a MANET. Since there is no central network to control network operations, control and management of a MANET is distributed among the wireless nodes. The MANET nodes cooperate to implement security and routing functions.

A MANET may implement different types of routing. Basic types of ad hoc routing algorithms are single-hop and multi-hop. These are based on different link layer attributes and routing protocols. A single-hop MANET is simpler than a multi-hop MANET, but lacks the functionality and flexibility of a multi-hip MANET. When delivering data packets from a source to its destination out of the direct wireless transmission range, the packets should be forwarded via one or more intermediate nodes.

Since MANET nodes are mobile, the radio frequency (RF) links may change rapidly and unpredictably over time. In order to compensate for traffic and propagation conditions, the MANET nodes dynamically modify routing information between each other as the nodes move, thereby forming new network topologies. Advantageously, a MANET node may operate not only within the mobile ad hoc network, but also may access a public fixed network (e.g., cellular network).

MANET nodes use the Ad Hoc On-Demand Distance Vector (AODV) routing protocol in ad hoc network environments in which the movement of the MANET nodes cause frequent changes in RF link quality. The AODV protocol enables the MANET nodes to adapt quickly to dynamic link conditions. The AODV algorithm enables dynamic, self-starting, multi-hop routing between mobile MANET nodes in an ad-hoc network. The AODV protocol enables the mobile MANET nodes to obtain routes for new destinations quickly and does not require the MANET nodes to maintain routes to destinations that are not in active communication. AODV provides quick convergence when the topology of the ad-hoc network changes (e.g., a new MANET node joins the network).

The AODV protocol uses a destination sequence number for each route entry. The destination node creates a destination sequence number for any usable route information the destination node sends to a requesting node. Using destination sequence numbers ensures loop freedom (i.e., prevents loops). Given a choice between two routes to a destination MANET node, a requesting node always selects one with the greatest sequence number. Advantageously, when the AODV protocol detects an RF link breakage, the AODV protocol immediately transmits notifications only to the affected set of nodes. Other nodes are not notified.

The AODV protocol provides some level of path information. A Trace Route application can be used to obtain the complete path information associated with a route. Unfortunately, the only routing information the AODV protocol in each MANET node tracks is the destination address of the route and the address of the MANET node at the next hop.

This information is inadequate for many applications, such as i) debugging the ad-hoc network protocols; ii) graphical overview of the ad-hoc network as it evolves; and iii) locating particular MANET nodes in the ad-hoc network.

The Trace Route application also does not operate in real-time and is not reactive to topology changes. Moreover, every MANET node in a route from a source node to a destination node must send trace route messages to collect the full path information. Thus, the current configuration of the AODV protocol is incomplete and inefficient.

Therefore, there is a need in the art for improved mobile ad hoc networks. In particular, there is a need for an improved routing protocol for use in a mobile ad hoc network (MANET).

SUMMARY OF THE INVENTION

The present invention introduces an apparatus and method for efficiently obtaining the complete path information of active routes. The present invention collects the complete path information by taking advantage of source route mechanism, while keeping the overhead control messages to a minimum. For every active route, only the MANET node that initiates the route discovery, and any node that does local link repair, must send source route messages. Since the path information is collected only for routes that are changed, periodic control packet exchanges are not required. The present invention enables available services in a MANET to be located and displayed and enables new kinds of services and applications to be implemented.

To address the above-discussed deficiencies of the prior art, it is a primary object of the present invention to provide, for use in a mobile ad hoc network formed by a plurality of mobile ad hoc network (MANET) nodes, a first MANET node capable of collecting route information associated with a first route from a source MANET node to a destination MANET node. According to an advantageous embodiment of the present invention, the first MANET node comprises: 1) a radio frequency (RF) transceiver capable of wirelessly communicating with other ones of the plurality of MANET nodes according to an ad hoc on-demand vector (AODV) protocol; and 2) a controller capable of receiving incoming data packets from the RF transceiver and sending outgoing data packets to the RF transceiver, wherein the controller receives a Path Marker Request message generated by the source MANET node and retrieves first route topology data associated with the first route from the first Path Marker Request message, the route first topology data identifying all intermediate MANET nodes in the first route coupling the first MANET node to the source MANET node.

According to one embodiment of the present invention, the controller stores the first retrieved route topology data in a route table associated with the controller.

According to another embodiment of the present invention, the retrieved first route topology data from the first Path Marker Request message comprises an IP address associated with each of the all intermediate nodes in the first route coupling the first MANET node to the source MANET node.

According to still another embodiment of the present invention, the controller appends an IP address associated with the first MANET node to the first Path Marker Request message.

According to yet another embodiment of the present invention, the controller forwards the first Path Marker Request message with the appended IP address to the destination MANET node via a next hop in the first route.

According to a further embodiment of the present invention, the controller receives a first Path Marker Reply message generated by the destination MANET node and retrieves second route topology data associated with the first route from the first Path Marker Reply message, the retrieved second route topology data identifying all intermediate MANET nodes in the first route coupling the first MANET node to the destination MANET node.

According to a still further embodiment of the present invention, the controller stores the second retrieved route topology data in the route table associated with the controller.

According to a yet further embodiment of the present invention, the retrieved second route topology data from the first Path Marker Reply message comprises an IP address associated with each of the all intermediate nodes in the first route coupling the first MANET node to the destination MANET node.

In one embodiment of the present invention, the controller appends an IP address associated with the first MANET node to the first Path Marker Reply message.

In another embodiment of the present invention, the controller forwards the first Path Marker Reply message with the appended IP address to the source MANET node via a next hop in the first route.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile ad hoc network.

Figure 1:
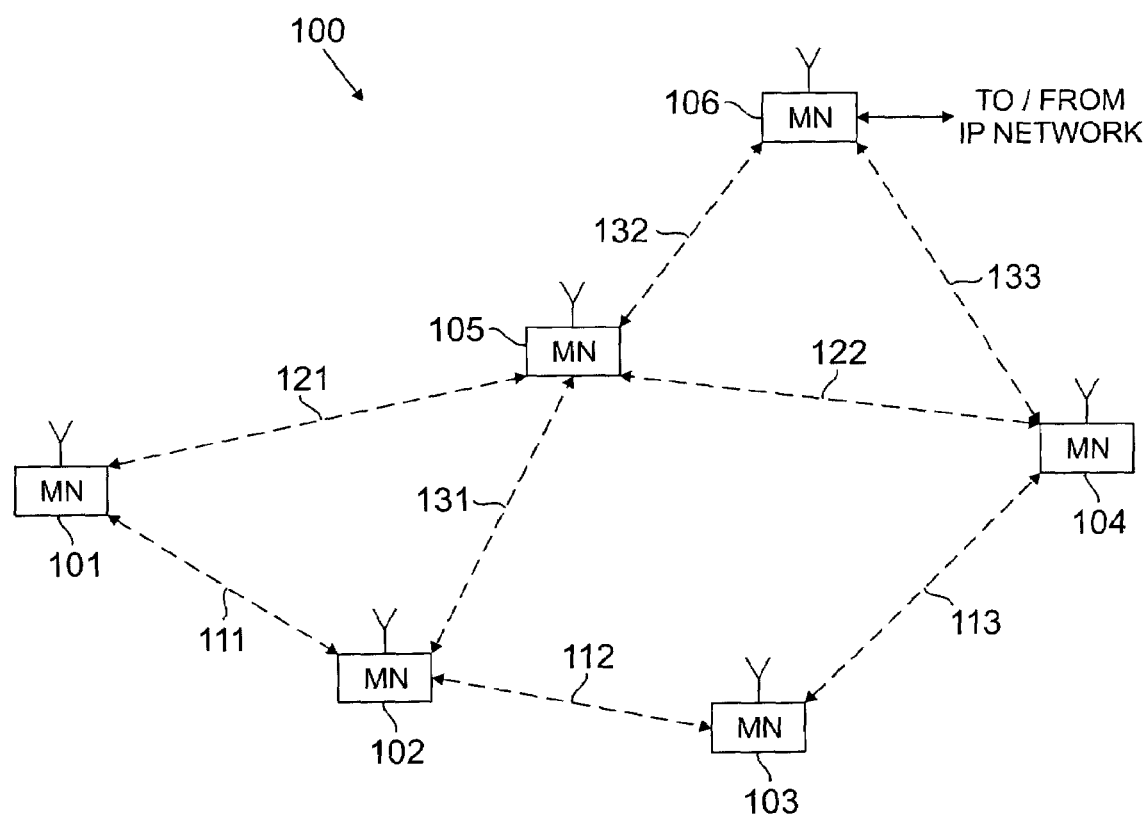
FIG. 1 illustrates an exemplary mobile ad hoc network (MANET) according to the principles of the present invention.

FIG. 1 illustrates exemplary mobile ad hoc network (MANET) 100 according to the principles of the present invention. MANET 100 comprises MANET nodes (MN) 101-106. Each one of MN 101-MN 106 is a conventional wireless terminal (e.g., cell phone, IEEE-802.11 device) that operates as a conventional MANET node. In an advantageous embodiment, at least some of MANET nodes 101-106 in MANET 100 may be multi-purpose wireless devices that can function in more than one type of wireless network. By way of example, MN 105 may comprise a dual-purpose transceiver that operates 1) as a CDMA2000 cell phone that accesses public cell phone networks; and 2) as an IEEE-802.11 wireless terminal that can operate in MANET 100.

Furthermore, at least one of MN 101-MN 106 may comprise a base station, access point, or other wireless terminal of a fixed infrastructure-based network, such as a cell phone network. For example, MN 106 may be an access point of an IEEE-802.11 wireless network that is coupled to a wireline Internet protocol (IP) network. Thus, MN 106 may function autonomously in MANET 100 or may act as an access point that allows, for example, MN 105 to access the Internet.

Each one of MANET nodes 101-106 is aware of the Internet protocol (IP) addresses of all of MANET nodes 101-106 and is capable of directly communicating with other ones of MANET nodes 101-106 via individual radio frequency (RF) links (or hops). The RF links (or hops) are shown as dotted lines in FIG. 1. MN 101 and MN 102 communicate via hop 111. MN 102 and MN 103 communicate via hop 112. MN 103 and MN 104 communicate via hop 113. MN 101 and MN 105 communicate via hop 121. MN 105 and MN 104 communicate via hop 112. MN 102 and MN 105 communicate via hop 131. MN 105 and MN 106 communicate via hop 132. MN 106 and MN 104 communicate via hop 133. Other hops may exist in MANET 100. However, for the sake of simplicity and clarity in explaining the present invention, these other hops are not shown.

The routes connecting a first MANET node and second MANET node may be specified in terms of the hops connecting the first and second MANET nodes. For example, MN 101 may communicate with MN 104 by a first route (Route A) comprising hops 121 and 122, by a second route (Route B) comprising hops 111, 112 and 113, and by a third route (Route C) comprising hops 111, 131, 132, and 133. Route A contains the least number of hops and Route C contains the most number of hops.

According to the principles of the present invention, MANET nodes 101-106 communicate using an improved version of the Ad Hoc On-Demand Distance Vector (AODV) protocol. The present invention defines three new message formats to gather complete route information that may be used by other applications in MANET nodes 101-106, such as debugging the ad-hoc network; ii) generating graphical overviews of the ad-hoc network over time; and iii) locating particular MANET nodes in the ad-hoc network. The three new messages are used to collect more complete path information. These three new messages are: i) the Path Marker Request message; ii) the Path Marker Reply message; and iii) the Gratuitous Path Marker Reply message.

Figure 2:
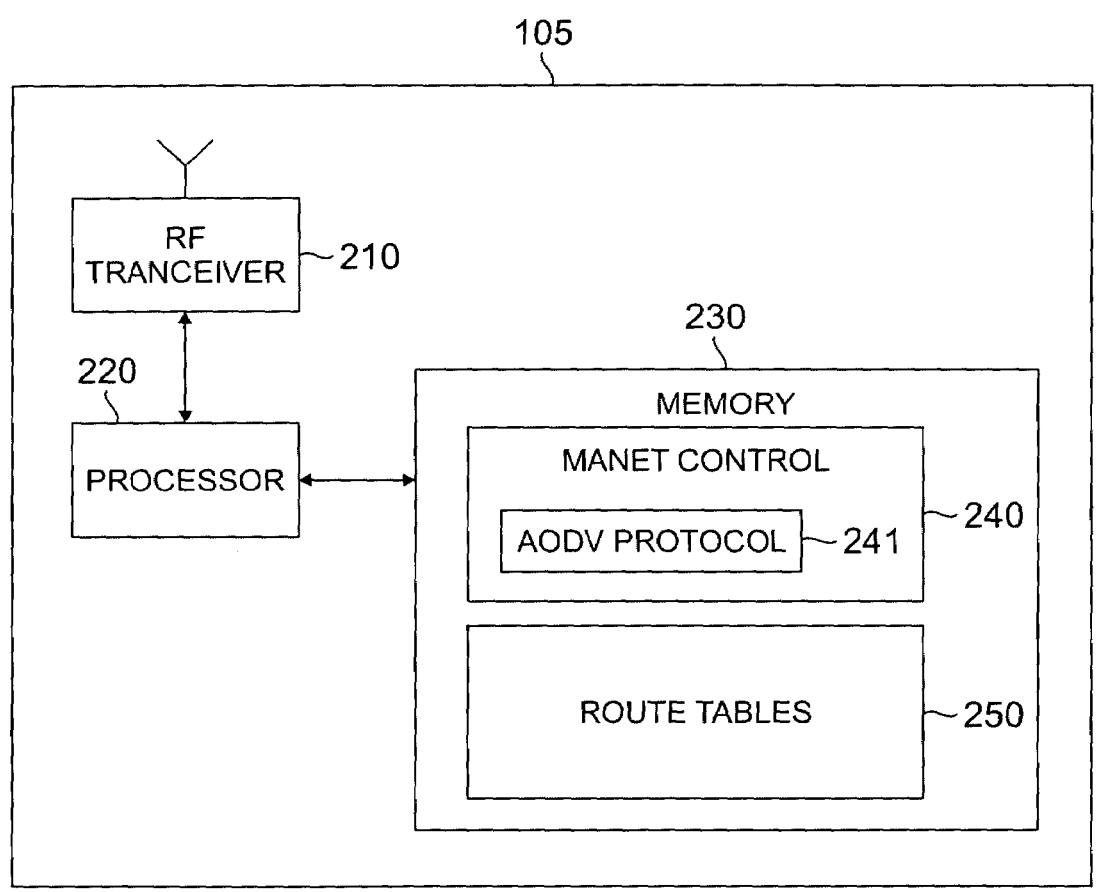
FIG. 2 illustrates an exemplary MANET node in greater detail according to one embodiment of the present invention.

FIG. 2 illustrates exemplary MANET node 105 in greater detail according to one embodiment of the present invention. MANET node (MN) 105 comprises radio frequency transceiver 210, data processor 220, and memory 230. Memory 230 stores MANET control program 240 and route tables 250, among other things. MANET control program 240 comprises AODV protocol algorithm 241. Data processor 220 executes the instructions in MANET control program 240, including the instructions stored in AODV protocol program 241. Together, data processor 220 and memory 230 form a controller that implements the present invention in MANET node 105.

When MANET node 105 is operating in MANET 100, data processor 220 builds route table 250 by storing route information received by neighboring MANET nodes. Under the control of AODV protocol algorithm 241, data processor 220 builds route table 250 using conventional AODV protocol messages, such as the Route Request (RREQ) message, the Route Reply (RREP) message, the Route Error (RERR) message, the Route Reply Acknowledgment (RREP ACK) message, and the like.

AODV protocol algorithm 241 is capable of both unicast and multicast routing. AODV protocol algorithm 241 builds a route between MANET nodes only as when requested by a source node. AODV protocol algorithm 241 maintains each route only for as long as the source node needs the route. AODV protocol algorithm 241 uses sequence numbers to ensure the freshness of routes. The route information for each route in Route Table 250 typically includes Destination IP Address, Destination Sequence Number, Valid Destination Sequence Number flag, Hop Count (number of hops need to reach destination), Next Hop, and a list of Precursor nodes, among other data values.

As noted above, for each active route, there is a list of precursors in Route Table 250. A precursor node is a node from which packets may be transmitted for forwarding to the destination MANET node. According to the AOCV protocol, each precursor node must be notified when the link to the next hop is determined to be broken.

AODV protocol algorithm 241 builds routes using a query cycle of route requests and route replies. When a source MANET node (e.g., MN 101) wants to send data to a destination MANET node (e.g., MN 104) for which source MANET node 101 does not already have an existing route, source MANET node 101 broadcasts a RREQ message packet across MANET 100. MANET nodes receiving this packet update their routing tables for source MN 101 and set up backwards pointers to source MN 101 in the route tables.

The RREQ message contains the IP address of source MN 101, the current sequence number, a broadcast ID value, and the most recent sequence number for destination MN 104 of which source MANET node is 101. A MANET node receiving the RREQ message may send back a RREP message if it is either destination MN 104 or if it has a route to destination MN 104 that has a corresponding sequence number greater than or equal to that contained in the RREQ message. If this is the case, the receiving MANET node unicasts a RREP message back to source MN 101. Otherwise, the receiving MANET node re-broadcasts the RREQ message. Each receiving nodes keep track of the source IP address of the RREQ message and the broadcast ID. If a receiving node receives a RREQ message that the receiving node has already processed, it discards the RREQ message and does not forward it.

As the RREP message propagates back to source MN 101, the intermediate nodes set up forward pointers to destination MN 104. Once source MN 101 receives the RREP message, source MN 101 may begin to forward data packets to destination MN 104. If source MN 101 later receives a RREP message containing a greater sequence number or contains the same sequence number with a smaller hop count, it may update its routing information for that destination and begin using the better route.

AODV protocol algorithm 241 maintains route information for a route as long as the route remains active. A route is considered active as long as data packets are periodically transmitted from source MN 101 to destination MN 104 along the path defined by the route. If source MN 101 stops sending data packets, the links time out and are deleted from the intermediate node routing tables. If a link break occurs while the route is active, the node upstream of the break propagates a route error (RERR) message to source MN 101 node to notify MN 101 of the link break. Source MN 101 may then establish a new route to destination MN 104.

Figure 3:
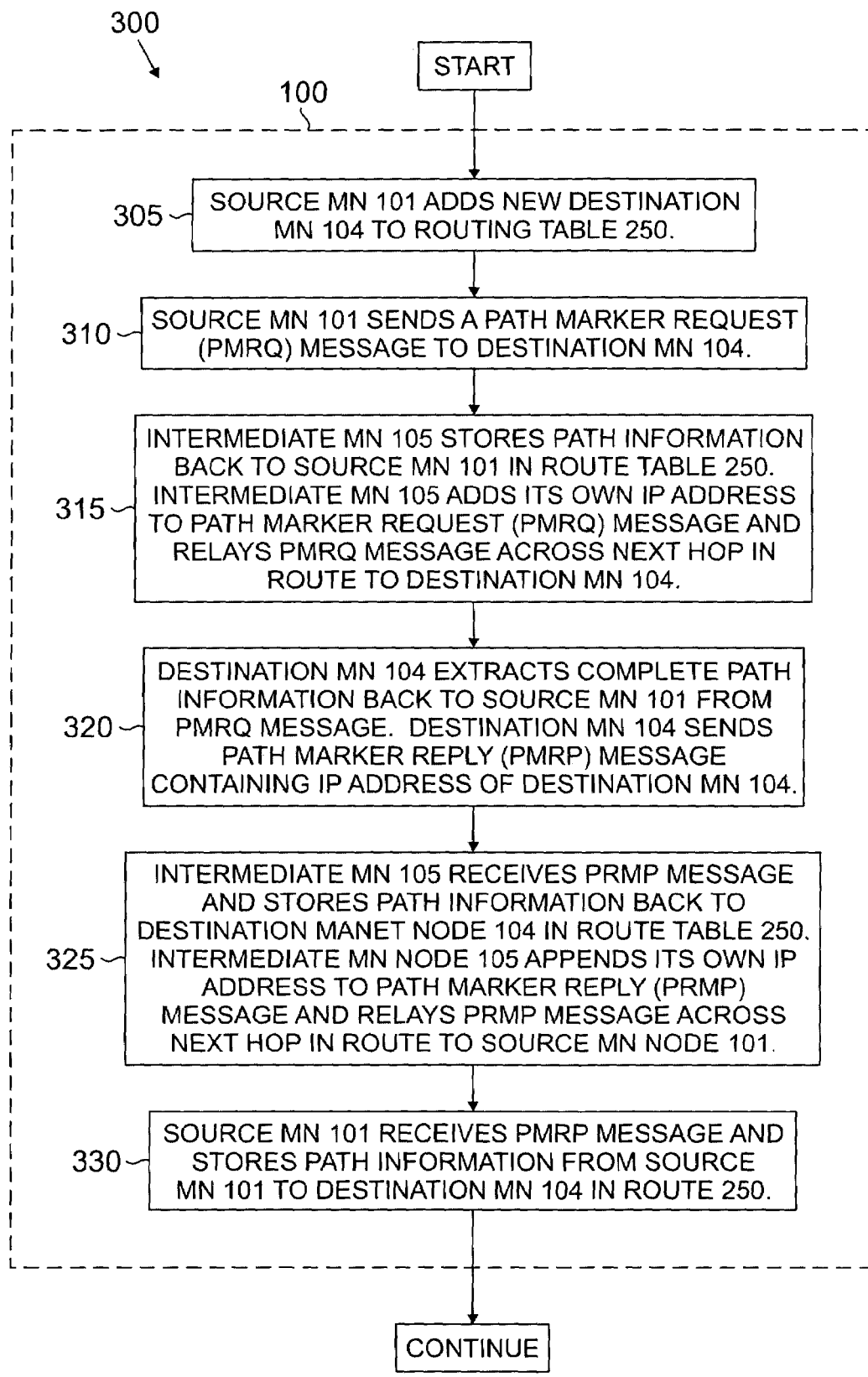
FIG. 3 is a flow diagram illustrating the use of the Path Marker Request message and the Path Marker Reply message in the exemplary MANET according to one embodiment of the present invention.

FIG. 3 depicts flow diagram 300, which illustrates the use of the Path Marker Request message and the Path Marker Reply message in MANET 100 according to one embodiment of the present invention. Initially, a source MANET node (e.g., MN 101) adds a new destination MANET node (e.g., MN 104) to its routing table 250 (process step 305). If the precursor list is null for destination MANET node 104, source MANET node 101 sends a Path Marker Request (PMRQ) message to destination MANET node 104 (process step 310).

When an intermediate MANET node (e.g., MN 105) receives the Path Marker Request (PMRQ) message, intermediate MANET node 105 stores the path information all the way back to source MANET node 101 in Route Table 250. Intermediate MANET node 105 then adds its own IP address to the Path Marker Request (PMRQ) message and relays the PMRQ message across the next hop in the route to destination MANET node 104 (process step 315).

Finally, destination MANET node 104 extracts the complete path information back to source MANET node 101 from the PMRQ message. Destination MANET node 104 then sends a Path Marker Reply (PMRP) message containing the IP address of destination MANET node 104 (process step 320). When intermediate MANET node 105 receives the PRMP message, intermediate MANET node 105 stores in Route Table 250 the path information all the way back to destination MANET node 104. Intermediate MANET node 105 then appends its own IP address to the Path Marker Reply (PRMP) message and relays the PRMP message across the next hop in the route to source MANET node 101 (process step 325). When source MANET node 101 finally receives the Path Marker Reply (PMRP) message, source MANET node 101 stores all the path information from itself to destination MANET node 104 (process step 330).

Figure 4:
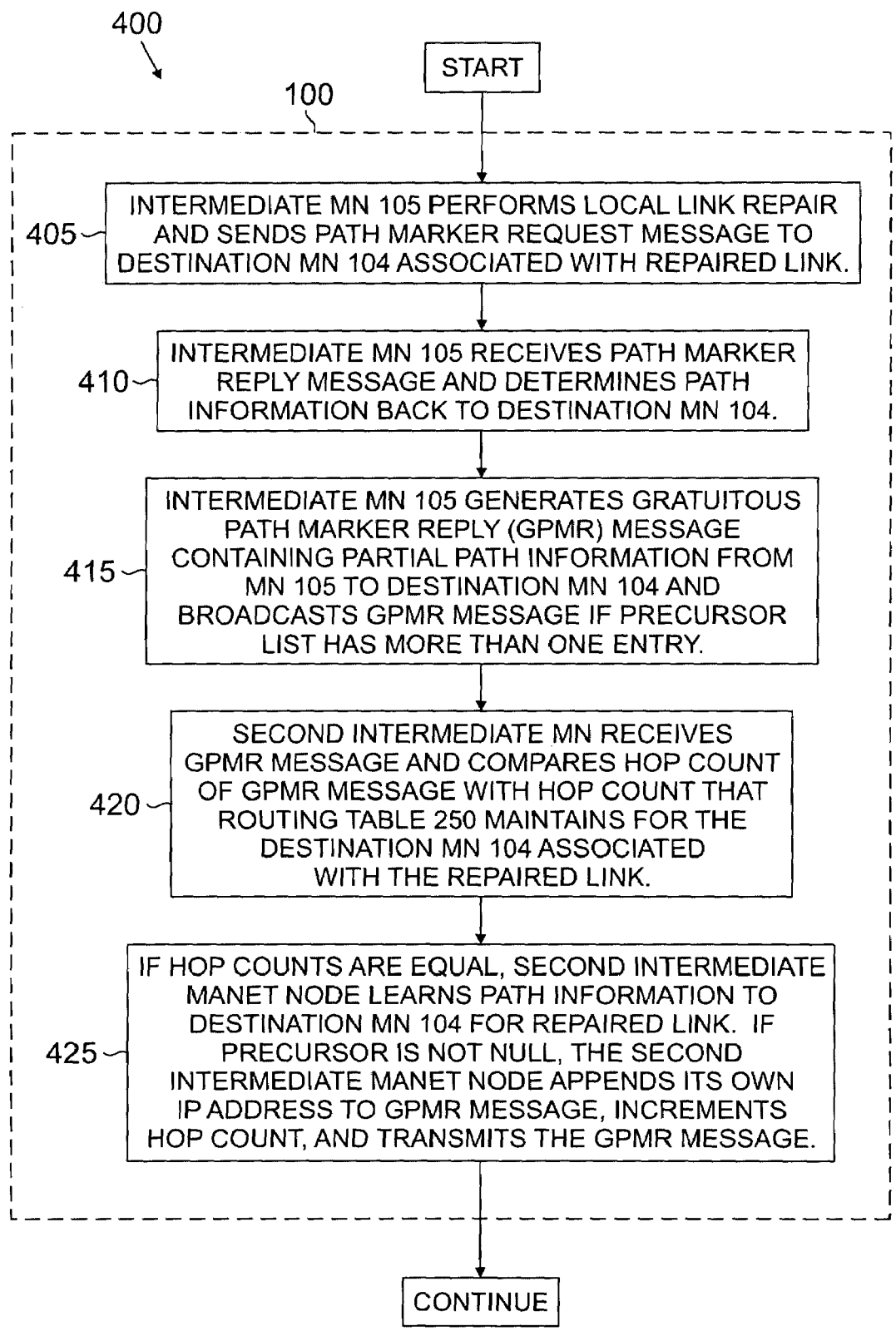
FIG. 4 is a flow diagram illustrating the use of the Gratuitous Path Marker Reply message in the exemplary MANET according to one embodiment of the present invention.

FIG. 4 depicts flow diagram 400, which illustrates the use of the Gratuitous Path Marker Reply message in MANET 100 according to one embodiment of the present invention. When an intermediate MANET node (e.g., MN 105) performs a successful local link repair, intermediate MANET node 105 sends a Path Marker Request message to the destination MANET node (e.g., MN 104) associated with the repaired link (process step 405). When intermediate MANET node 105 receives the Path Marker Reply message, intermediate MANET node 105 determines the path information back to destination MANET node 104 (process step 410).

Intermediate MANET node 105 then generates a Gratuitous Path Marker Reply (GPMR) message containing the partial path information from itself to destination MANET node 104 and broadcasts the GPMR message if the precursor list has more than one entry (process step 415). If the precursor list for the repaired link destination has only one entry, then intermediate MANET node 105 unicasts the GPMR message. When the second intermediate MANET node receives the GPMR message, the second intermediate MANET node compares the Hop Count of the GPMR message with the Hop Count that Routing Table 250 maintains for the destination MANET node 104 associated with the repaired link (process step 420). If the Hop Counts are not equal, the second intermediate MANET node discards the GPMR message. If the Hop Counts are equal, the second intermediate MANET node learns the path information to the destination MANET node for the repaired link. If the precursor is not null, the intermediate MANET node appends its own IP address to the GPMR message, increments the Hop Count, and transmits the GPMR message (process step 425).

As described above, the Path Marker Request message and the Path Marker Reply message allow the source MANET node, the destination MANET node, and all intermediate MANET nodes in a route to gather a complete set of route information. This can be done for each route handled by each node. Thus, for example, MANET node 105 in FIG. 1, which is part of both Route A and Route C, gathers complete route information about both Route A and Route C. MANET node 105 gathers route information from a first Path Marker Request message generated by source MANET node 101 and associated with Route A and from a first Path Marker Reply message generated by destination MANET node 104 and associated with Route A. MANET node 105 also gathers route information from a second Path Marker Request message generated by source MANET node 101 and associated with Route C and from a second Path Marker Reply message generated by destination MANET node 104 and associated with Route C. MANET node 105 can then use the complete route information for Route A and for Route C in various applications, such as debugging or displaying the network topology to a user of MANET node 105.

Advantageously, the present invention reduces overhead in collecting topology information by using source route message only after establishing routes. The present invention also does not send route request messages at each node to obtain the network topology. The present invention further reduces overhead after repairing a local link case by notifying only those nodes that actually use the repaired route and by not broadcasting to all nodes in MANET 100.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a mobile ad hoc network formed by a plurality of mobile ad hoc network (MANET) nodes, a first MANET node capable of collecting route information associated with a first route from a source MANET node to a destination MANET node, said first MANET node comprising:

a radio frequency (RF) transceiver capable of wirelessly communicating with other ones of said plurality of MANET nodes according to an ad hoc on-demand vector (AODV) protocol; and a controller capable of receiving incoming data packets from said RF transceiver and sending outgoing data packets to said RF transceiver, wherein said controller receives a Path Marker Request message generated by said source MANET node and retrieves first route topology data associated with said first route from said first Path Marker Request message, said first route topology data identifying all intermediate MANET nodes in said first route coupling said first MANET node to said source MANET node.

2. The first MANET node as set forth in claim 1 wherein said controller stores said first retrieved route topology data in a route table associated with said controller.

3. The first MANET node as set forth in claim 2 wherein said retrieved first route topology data from said first Pat Marker Request message comprises an IP address associated with each of said all intermediate nodes in said first route coupling said first MANET node to said source MANET node.

4. The first MANET node as set forth in claim 3 wherein said controller appends an IP address associated with said first MANET node to said first Path Marker Request message.

5. The first MANET node as set forth in claim 4 wherein said controller forwards said first Path Marker Request message with said appended ID address to said destination MANET node via a next hop in said first route.

6. The first MANET node as set forth in claim 5 wherein said controller receives a first Path Marker Reply message generated by said destination MANET node and retrieves second route topology data associated with said first route from said first Path Marker Reply message, said retrieved second route topology data identifying all intermediate MANET nodes in said first route coupling said first MANET node to said destination MANET node.

7. The first MANET node as set forth in claim 6 wherein said controller stores said second retrieved route topology data in said route table associated with said controller.

8. The first MANET node as set forth in claim 7 wherein said retrieved second route topology data from said first Path Marker Reply message comprises an IP address associated with each of said all intermediate nodes in said first route coupling said first MANET node to said destination MANET node.

9. The first MANET node as set forth in claim 8 wherein said controller appends an IP address associated with said first MANET node to said first Path Marker Reply message.

10. The first MANET node as set forth in claim 9 wherein said controller forwards said first Path Marker Reply message with said appended IP address to said source MANET node via a next hop in said first route.

11. For use in a mobile ad hoc network formed by a plurality of mobile ad hoc network (MANET) nodes, a method of collecting route information in a first MANET node, the route information associated with a first route from a source MANET node to a destination MANET node, the method comprising the steps of:

receiving in the first MANET node a Path Marker Request message generated by the source MANET node; and retrieving first route topology data associated with the first route from the first Path Marker Request message, the first route topology data identifying all intermediate MANET nodes in the first route coupling the first MANET node to the source MANET node.

12. The method as set forth in claim 11 further comprising the step of storing the first retrieved route topology data in a route table in the first MANET node.

13. The method as set forth in claim 12 wherein the retrieved first route topology data from the first Path Marker Request message comprises an IP address associated with each of the all intermediate nodes in the first route coupling the first MANET node to the source MANET node.

14. The method as set forth in claim 13 further comprising the step of appending an IP address associated with the first MANET node to the first Path Marker Request message.

15. The method as set forth in claim 14 further comprising the step of forwarding the first Path Marker Request message with the appended IP address to the destination MANET node via a next hop in the first route.

16. The method as set forth in claim 15 further comprising the steps of:

receiving a first Path Marker Reply message generated by the destination MANET node; and retrieving second route topology data associated with the first route from the first Path Marker Reply message, the retrieved second route topology data identifying all intermediate MANET nodes in the first route coupling the first MANET node to the destination MANET node.

17. The method as set forth in claim 16 further comprising the step of storing the second retrieved route topology data in the route table.

18. The method as set forth in claim 17 wherein the retrieved second route topology data from the first Path Marker Reply message comprises an IP address associated with each of the all intermediate nodes in the first route coupling the first MANET node to the destination MANET node.

19. The method as set forth in claim 18 further comprising the step of appending an IP address associated with the first MANET node to the first Path Marker Reply message.

20. The method as set forth in claim 19 further comprising the step of forwarding the first Path Marker Reply message with the appended IP address to the source MANET node via a next hop in the first route.

* * * * *

UNITED STATES PATENT AND TRADEMARK OFFICE
CERTIFICATE OF CORRECTION

PATENT NO. : 7,415,019 B2
APPLICATION NO. : 10/764129
DATED : August 19, 2008
INVENTOR(S) : Mohan R. Duggi Page 1 of 1

It is certified that error appears in the above-identified patent and that said Letters Patent is hereby corrected as shown below:

Column 9, Claim 3, line 8, delete "Pat" and replace with --Path--; and

Column 9, Claim 5, line 18, delete "ID" and replace with --IP--.

Signed and Sealed this

Twenty-second Day of September, 2009

David J. Kappos
*Director of the United States Patent and Trademark Office*